Patented June 17, 1952

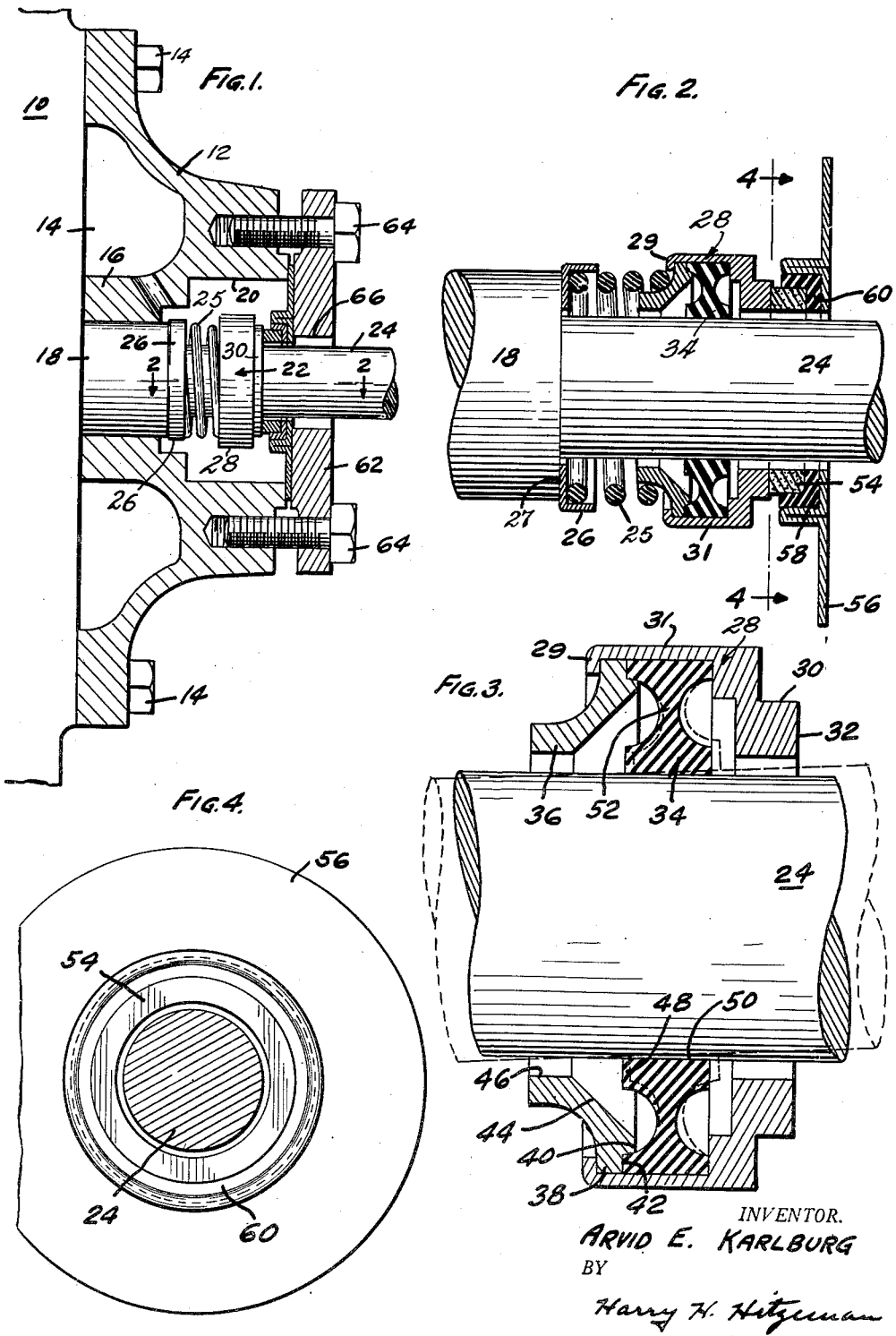

2,600,879

UNITED STATES PATENT OFFICE 2,600,879

SHAFT SEAL

Arvid E. Karlberg, Chicago, Ill.

Application December 17, 1949, Serial No. 133,502

2 Claims. (Cl. 286—11)

My invention relates to improvements in mechanical shaft seals and similar devices.

My invention relates more particularly to improvements in oil or pressure seals of the type in which a sealing unit is provided with a seal nose rotating with the shaft and bearing against a stationary sealing ring fastened to the bore of the housing from which the shaft extends.

Shaft seals of the type above referred to are well known in the art and have come into considerable commercial use during the last few years. These seals normally include a seal unit having a nose member encircling the shaft and a ring member, one of which is stationary and the other rotating with the shaft so that a face sealing surface is provided between these two parts, spring means being usually provided to yieldingly frictionally engage the faces.

One of the principal objects of the present invention is to provide a simple construction of shaft seals, with few parts and capable of easy and simple installation or removal.

Another object of the invention is to provide an improved construction of a flexible connection between the shaft and seal unit whereby wobble, whipping, vibration or other uneven rotation of the shaft will not effect the direct face-to-face contact of the seal nose and sealing ring.

Another object of the invention is to provide a flexible mounting of both the seal nose and sealing ring so that regardless of the angular movement of the shaft during rotation the engaging faces of the above parts will always be in perfect alignment.

Other objects and advantages will be more apparent from the following description wherein reference is had to the accompanying drawings, upon which Fig. 1 is a fragmentary view of a compressor or similar device from which a shaft extends, a portion thereof being broken in section to show the installation of the shaft seal;

Fig. 2 is an enlarged fragmentary section taken on the line 2—2 of Fig. 1;

Fig. 3 is an enlarged sectional view of the seal unit and shaft with a dotted line position to show the operation of the flexible mounting therefor; and Fig. 4 is a vertical sectional view taken generally on the line 4—4 of Fig. 2.

In the embodiment of the invention which I have chosen to illustrate and describe, I have shown a compressor housing 10 having a bracket member 12 secured to the side thereof by bolt member 14. The bracket 12 may have a chamber 14 therein communicating with the interior of the compressor and a bearing portion 16 within which the compressor shaft 18 is mounted for rotation. The bracket 12 may form a housing having a bore 20 within which the sealing unit 22 is mounted, the shaft 18 having a reduced portion 24 extending therethrough.

The seal unit 22 may comprise the cup-shaped spring retainer 26 which bears against the shoulder 27 of the shaft 18, a cylindrical housing 28 and a coiled compression spring 25 disposed between the spring retainer 26 and one end of the housing 28.

The housing 28 may be cylindrical as shown with a reduced annular portion 30 surrounding the shaft 24 and provided with a seal face 32. I provide a flexible or resilient collar member 34 positioned within the housing 28 and held against removal by a backing member 36. The backing member 36 may have a peripheral ledge 38 formed with an inturned shoulder 40 which is secured about the circular ledge 42 of the collar 34. It also has a tapered bore 44 extending therefrom to a cylindrical bore 46 which permits the housing assembly to be telescoped over the shaft 24. The collar 34 has an inner concentric ledge 48 with a bore 50 therethrough of a size smaller than the shaft so that when the unit is mounted upon a shaft, the collar provides a fluid seal around the shaft and also a frictional drive so that the unit rotates with the shaft. As can be seen, the side faces of the ledges 42 and 48 are both in the same vertical plane on each side of the ledges with respect to the central axis of the collar member. The end 29 of the housing 28 is curled or spun in to lock the collar and backing plate therein as a unit.

It will be noted that the wall 52 between the circular ledges 42 and 48 is considerably narrower than the collar itself for the following purpose. When there is a wobble, a whipping or vibration in the shaft and the bearing nose 32 is rotating against the stationary sealing ring 54, the housing will remain in alignment with the sealing ring 54 even though the shaft wobbles or vibrates at an angle, the collar being flexible and resilient so that one portion of it will follow the movement of the shaft, the ledge 42 fastened in the housing always retaining its original position. In effect, the collar will flex about a central axis transverse to the shaft upon which it is mounted, the collar always returning to normal position with the concentric ledges aligned when the wobble or vibration ceases.

The stationary ring member 54 may be mounted in a disc-like flange member 56 formed of sheet metal and provided with a pocket 58 to receive a cup shaped compressible gasket 60. The ring member 54 may be frictionally retained in the cup member 60, and because of the fact that the cup member is compressible, the ring member is also mounted in a flexible mounting so that slight annular movement thereof may take place if necessary to always provide a line contact between the sealing faces of the ring member and the rotating nose portion 30 of the housing 28.

The ring member retaining flange 56 may be fastened in position at the end of bore 20 of the housing 12 by means of a face plate 62 which is fastened to the housing 12 by bolt members 64, the face plate having a bore 66 through which the shaft 24 may extend.

From the foregoing description, it will be apparent to those skilled in the art that I have provided a fluid-tight mechanical seal constructed of a minimum of parts and in which both the stationary and the rotating seal members are flexibly mounted so that regardless of slight misalignment of the rotating shaft or vibration or whipping, the seal faces will always be in facial alignment, thereby insuring at all times a fluid-tight seal for the housing.

While I have illustrated and described a specific embodiment of the invention, it will be apparent to those skilled in the art that changes and modifications may be made in the exact details shown, and I do not wish to limit myself in any particular; rather what I desire to secure and protect by Letters Patent of the United States is:

1. A seal assembly for preventing flow of fluid along the surface of a horizontally disposed cylindrical shaft, comprising a cylindrically shaped housing having an enlarged bore therein and adapted to loosely encircle said shaft, said housing having a reduced annular end nose provided with a seal face extending therefrom and adapted to bear axially against an annular surface about said shaft, a resilient collar member mounted in the bore of said housing, on a central axis transverse to said shaft, said collar member being of generally cylindrical shape and defined by radially spaced concentric ledges, said ledges having side faces, said side faces being on both sides of the central axis of said collar member and in the same vertical plane and a wall between said side faces connecting said concentric ledges, said wall being formed by inwardly dished annular surfaces symmetrically arranged on each side of said central axis, said outer ledge frictionally engaging the inner surface of the bore of said housing and said inner ledge having a bore therethrough of a size smaller than said shaft whereby the seal assembly may be mounted on said shaft, a backing plate having an axial bore for said shaft and a peripheral ledge adapted to bear against the side of said outer concentric ledge of said collar member, said backing plate forming the end wall of said housing member and spring means bearing against said backing plate for holding the end nose of said seal assembly against an annular surface in a sealing position.

2. A shaft seal assembly for preventing flow of fluid along the surface of a horizontally disposed cylindrical shaft comprising a cylindrical housing adapted to encircle the shaft with a reduced ring-shaped bearing nose at one end adapted to bear against an annular surface, spring means normally urging said seal assembly forward, said bearing nose being formed integral with said housing and a flexible collar in said housing for mounting the same upon the shaft, on a central axis transverse to said shaft, said collar member being of generally cylindrical shape and defined by radially spaced concentric ledges, said ledges having side faces, said side faces being on both sides of the central axis of said collar member and in the same vertical plane and a wall between said side faces connecting said concentric ledges, said wall being formed by inwardly dished annular surfaces symmetrically arranged on each side of said central axis, one of said ledges having an axial opening for mounting said seal assembly on said shaft and the other connected about its periphery to said housing.

ARVID E. KARLBERG.

REFERENCES CITED

The following references are of record in the file of this patent:

UNITED STATES PATENTS

| Number | Name | Date |
|---|---|---|
| 2,365,351 | Matter | Dec. 19, 1944 |
| 2,379,868 | Curtis | July 10, 1945 |
| 2,445,207 | Coserta | July 13, 1948 |
| 2,461,907 | Magnesen | Feb. 15, 1949 |
| 2,463,695 | Jensen | Mar. 8, 1949 |
| 2,525,366 | Meyer | Oct. 10, 1950 |

FOREIGN PATENTS

| Number | Country | Date |
|---|---|---|
| 491,412 | Great Britain | Sept. 1, 1938 |